United States Patent
Wilson et al.

(10) Patent No.: US 12,486,034 B2
(45) Date of Patent: Dec. 2, 2025

(54) RECLINING SEAT WITH COORDINATED LOWERING MOTION AND SLIDING MONITOR

(71) Applicant: B/E Aerospace, Inc., Winston-Salem, NC (US)

(72) Inventors: Christopher M. Wilson, Clemmons, NC (US); Javier Valdes de la Garza, Winston-Salem, NC (US); Jeremy R. Loman, Lexington, NC (US); David J. Poole, Winston-Salem, NC (US); John R. Kuyper, Winston Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 202 days.

(21) Appl. No.: 18/216,265

(22) Filed: Jun. 29, 2023

(65) Prior Publication Data
US 2025/0002151 A1 Jan. 2, 2025

(51) Int. Cl.
*B64D 11/00* (2006.01)
*B60R 11/02* (2006.01)
*B64D 11/06* (2006.01)

(52) U.S. Cl.
CPC .... *B64D 11/00151* (2014.12); *B60R 11/0235* (2013.01); *B64D 11/064* (2014.12)

(58) Field of Classification Search
CPC ............ B64D 11/00151; B64D 11/064; B60R 11/0235; B60R 2011/0276
See application file for complete search history.

(56) References Cited

U.S. PATENT DOCUMENTS

| | | | |
|---|---|---|---|
| 6,994,236 B2 * | 2/2006 | Hsu | B60R 11/0235 297/217.3 |
| 8,308,237 B2 * | 11/2012 | Kunou | B60R 11/0235 297/217.3 |
| 8,625,034 B2 * | 1/2014 | Campbell | B60K 35/10 348/836 |
| 10,543,791 B2 * | 1/2020 | Rook | B60R 11/0235 |
| 10,647,265 B2 * | 5/2020 | Kelly | B60R 11/02 |
| 10,737,634 B2 * | 8/2020 | Lecomte | B60R 11/0235 |

(Continued)

FOREIGN PATENT DOCUMENTS

| | | |
|---|---|---|
| EP | 2147614 B1 | 7/2018 |
| EP | 3206951 B1 | 3/2021 |

(Continued)

OTHER PUBLICATIONS

European Patent Office, Extended European Search Report received in EP Application No. 24181775.8, Oct. 25, 2024, 14 pages.

*Primary Examiner* — Timothy J Brindley
(74) *Attorney, Agent, or Firm* — Suiter Swantz IP (57) ABSTRACT

A passenger seat assembly includes features to mitigate privacy and use concerns that accompany backrest recline. In embodiments, the assembly includes a seat frame, a seat pan coupled to the seat frame, a backrest coupled to the seat frame, a backrest extension movably coupled to the backrest, the backrest extension configured to move between a retracted position within the backrest and an extended position above a top of the backrest, and a monitor rotatably mounted to the backrest extension and movable with the backrest extension. In use, backrest extension movement and/or monitor movement may be coordinated with backrest rotation motion.

17 Claims, 5 Drawing Sheets

(56) References Cited

U.S. PATENT DOCUMENTS

| | | | | |
|---|---|---|---|---|
| 2009/0008974 A1* | 1/2009 | Hattori | ................ | B60R 11/0235 |
| | | | | 297/217.3 |
| 2009/0085383 A1* | 4/2009 | Hicks | ....................... | B60N 2/64 |
| | | | | 297/217.3 |
| 2010/0259078 A1* | 10/2010 | Saito | ................... | B60R 11/0235 |
| | | | | 348/836 |
| 2015/0312546 A1* | 10/2015 | Hasegawa | ............ | H04N 13/373 |
| | | | | 348/59 |
| 2016/0159481 A1* | 6/2016 | Gianakopoulos | .. | B64D 11/0015 |
| | | | | 297/217.3 |
| 2017/0129413 A1* | 5/2017 | Yu | ....................... | F16M 11/2064 |
| 2019/0259171 A1* | 8/2019 | Ueno | ................... | B60N 2/0248 |
| 2020/0094967 A1* | 3/2020 | Hoshino | ............. | B64D 11/064 |
| 2022/0348148 A1* | 11/2022 | Fitzpatrick | ............... | B60N 2/22 |
| 2023/0039693 A1* | 2/2023 | Dessapt | ............. | B60R 11/0229 |

FOREIGN PATENT DOCUMENTS

| | | | | |
|---|---|---|---|---|
| EP | 3594121 B1 | 10/2022 | | |
| KR | 20150077619 A | * | 7/2015 | |
| WO | WO-2019119123 A1 | * | 6/2019 | ............... B60N 2/14 |
| WO | WO-2021021162 A1 | * | 2/2021 | ............. B60N 2/015 |
| WO | WO-2021066792 A1 | * | 4/2021 | ............... B60N 2/12 |
| WO | WO-2021066800 A1 | * | 4/2021 | ....... B64D 11/00151 |

\* cited by examiner

RECLINING SEAT WITH COORDINATED LOWERING MOTION AND SLIDING MONITOR

TECHNICAL FIELD AND BACKGROUND

The present disclosure relates generally to a reclinable passenger seat, and more particularly, to a passenger seat including a backrest extension including a video monitor, wherein the backrest extension is configured to move as the backrest reclines to maintain privacy and a consistent use of the monitor for a passenger seated in the next row.

Passenger seats such as those utilized in airliners are typically configured to adjust between an upright sitting position for taxi, takeoff, and landing (TTOL), and a more comfortable sitting position during flight. Economy class seat adjustment is typically limited to shallow backrest recline, whereas business and other premium class seat adjustments may be more comprehensive, and in some instances include coordinated seat component adjustments to achieve a flat bed.

The extent of the seat adjustment depends on the seating class, present seat components, capabilities of the seat, and seat pitch. For example, business class seats may include a leg rest to provide lower leg and foot comfort. Economy and premium economy class seats typically do not include a leg rest, and therefore focus their comfort efforts on the reclining backrest and angular relationship with the seat pan.

In addition to comfort, seat constructions also consider the placement of controls and devices. For example, armrests may serve to locate seat controls, while backrests may be used to locate in-flight entertainment (IFE) devices and tray tables for use by passengers seated in the next row. While a limited angular change of a backrest may have a minimal impact on the viewing angle and use of backrest-mounted devices, significant elevation and angular changes result in poor ergonomic use positions for the aft passenger. In addition, when a highly adjustable seat in a row configuration is reclined, the aft passenger is able to see over the backrest thereby degrading the privacy between seat rows.

Therefore, there is a need for a passenger seat with features for maintaining privacy and consistent use of seat features when the backrest is reclined.

BRIEF SUMMARY

In one aspect, embodiments of the inventive concepts disclosed herein are directed to a passenger seat assembly. In embodiments, the passenger seat assembly includes a seat frame, a seat pan coupled to the seat frame, a backrest coupled to the seat frame, a backrest extension movably coupled to the backrest, the backrest extension configured to move between a retracted position within the backrest and an extended position above a top of the backrest, and a monitor rotatably mounted to the backrest extension and movable with the backrest extension.

In some embodiments, the assembly further includes a first actuator coupled to the backrest and to the backrest extension, a second actuator coupled to the backrest extension and to the monitor, and a controller, including a processor. The controller is configured to operate the first actuator to move the backrest extension toward the extended position as the backrest reclines, wherein the amount of movement of the backrest extension is determined by the amount of backrest recline, and operate the second actuator to rotate the monitor, wherein the amount of rotation of the monitor is determined by the amount of backrest recline.

In some embodiments, the operation of the first actuator and the operation of the second actuator are mutually inclusive operations.

In some embodiments, the assembly further includes a third actuator coupled to the seat frame and to the backrest, wherein the controller is further configured to operate the third actuator to rotate the backrest.

In some embodiments, the controller is configured to coordinate operation of the first actuator, the second actuator, and the third actuator.

In some embodiments, the seat pan is configured to lower as the backrest reclines.

In some embodiments, the backrest is configured with more than 5 degrees of recline, and in some embodiments, more than 10 degrees of recline.

In some embodiments, the backrest includes a fixed headrest portion, and the backrest extension is positioned behind the fixed headrest portion.

In some embodiments, the backrest extension and the backrest have substantially equal widths.

According to another aspect, the present disclosure provides an aircraft passenger seat assembly. In embodiments, the aircraft passenger seat assembly includes a seat frame, a seat pan coupled to the seat frame, and a backrest coupled to the seat frame, the backrest having an axis of rotation configured to lower as the backrest reclines. The assembly further includes a backrest extension movably coupled to the backrest configured to move between a retracted position within the backrest and an extended position above a top of the backrest, and a monitor rotatably mounted to the backrest extension and movable with the backrest extension.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a passenger seat assembly, for instance a passenger seat assembly for use in an airliner. In embodiments, multiple passenger seat assemblies may be positioned to form rows in a cabin, for instance longitudinally-aligned in an economy class cabin, premium economy class cabin, business class cabin, etc. Each passenger seat assembly includes a front portion configured to support a passenger, and a back portion configured to mount amenities for use by a passenger sitting in the next row.

In embodiments, the passenger seat assembly includes a backrest configured to recline, and in some embodiments, also configured to lower at the same time the backrest reclines. By both reclining and lowering, privacy between seat rows is diminished considering the low resultant height of the fully reclined backrest. At the same time, the viewing experience of a passenger in the next row using the forward monitor may be diminished considering the lower monitor height and changed viewing angle. To compensate for the change in backrest position, the seat assembly includes a backrest extension movably coupled to the backrest. The monitor is rotatably mounted to the backrest extension such that the monitor moves with the backrest extension and also relative to the backrest extension.

In some embodiments, operation of the backrest extension and rotation of the monitor may be performed manually. In other embodiments, operation of the backrest extension and rotation of the monitor may be automated, for instance by a controller configured to coordinate at least one of backrest extension motion and monitor rotation with the backrest recline motion. For example, the controller, via actuator control, may move (e.g., raise) the backrest extension toward its extended position responsive to the backrest being reclined, and may move (e.g., lower) the backrest extension toward its retracted position responsive to the backrest being moved toward upright. The same may be true for monitor rotation. In some embodiments, the amount of backrest extension linear motion may correspond to the amount of backrest rotational motion. The same may be true for monitor rotation, with a direct relationship to the backrest or to the backrest extension.

Benefits and advantages of the backrest extension with the rotating monitor include the ability to maintain privacy and ergonomic use of seat features for a highly-reclinable backrest and/or a backrest that moves closer to the floor as the backrest reclines. As used herein, the term "highly-reclinable" may mean a backrest configured with more than about 5 degrees of recline, more preferably, more than about 10 degrees of recline. In use, the backrest extension essentially functions to lengthen the backrest to compensate for the backrest lowering during recline, thereby blocking the forward view of the aft passenger.

In some embodiments, the adjustments of one or more of the passenger seat, backrest extension position, and monitor tilt may be performed manually by the respective passengers. In other embodiments, in which the seat, backrest extension, and monitor motions are automated, the controller may operate to return the monitor to a stowed state within the backrest extension, return the backrest extension to its retracted state within the backrest, and return the sitting position of the seat to upright in preparation for taxi, takeoff, and landing (TTOL). Component adjustments may be performed using actuators, known to those in the field of adjustable passenger seats, capable of linear and/or rotational motions. In some embodiments, the seat does not include a leg rest considering the lowering motion instead provides improved lower leg and foot comfort.

Additional advantages and benefits of the passenger seat assemblies disclosed herein include, but are not limited to, a more highly adjustable and ergonomic seat without having to add a leg rest, a highly reclinable seat without having to introduce a privacy shell in surrounding relation to the seat, a more comfortable seat suitable for application in both economy and premium cabin classes, seat automation to return to an upright sitting position, and enhanced positioning of a monitor for an aft passenger.

Figure 1:
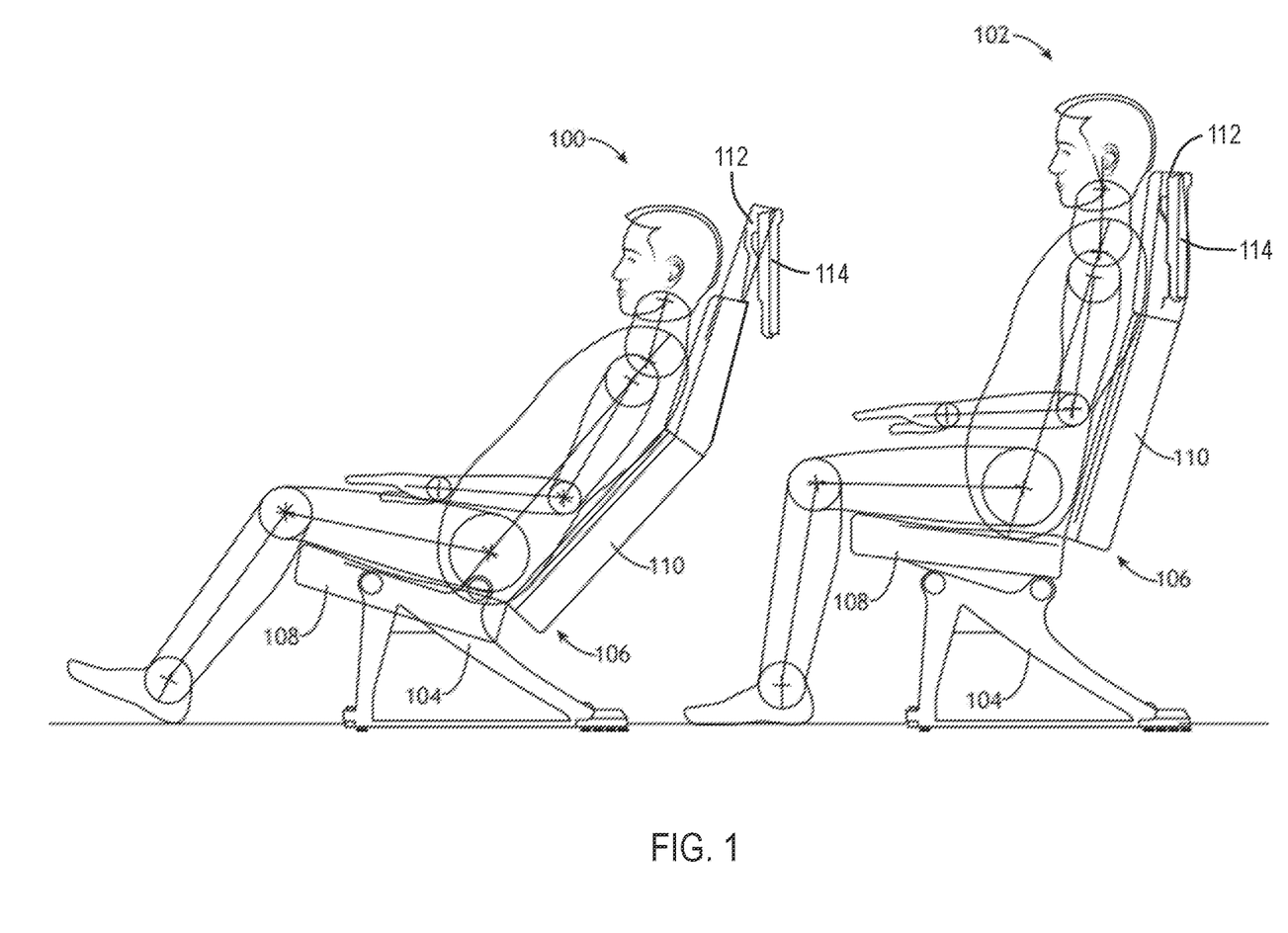
FIG. 1 is a side elevation view of two longitudinally-adjacent passenger seats shown in different states of recline and with different backrest extension positions, in accordance with example embodiments of this disclosure.

FIG. 1 illustrates a positional relationship of two passenger seat assemblies 100, 102 according to the present disclosure. The passenger seat assemblies 100, 102 are shown arranged in two rows in which the passenger seat assemblies 100, 102 are longitudinally-aligned such that the passenger on the right has use of the seat features mounted to the back of the passenger seat assembly 100 on the left. Passenger seat assemblies may be repeated along the longitudinal length of the cabin, and may be positioned with any predefined number of seats in each row. Each passenger seat assembly 100, 102 generally includes a seat frame 104 supporting a subassembly 106 generally including a seat pan 108 and a backrest 110. The seat pan 108 and the backrest 110 may be separately coupled to the seat frame 104, or may be coupled to the seat frame 104 as a unit, for instance through a guide assembly for guiding motions of each component.

The passenger seat assembly 100 on the left is shown in a reclined and lowered sitting position. The passenger seat assembly 102 on the right is shown in an upright sitting position, for instance a TTOL compliant sitting position. It can be seen that the backrest 110 on the left passenger seat assembly 100 is shallower in angle (i.e., nearer to horizontal) and positioned lower in elevation as compared to the backrest 110 on the right passenger seat assembly 102. The particular mechanism that controls the seat component motions is not critical to the present invention. For example, a motion mechanism may include a pivotal attachment of the seat pan 108 and the backrest 110 forming the axis of rotation of the backrest, and tracking the pivotal attachment using linkages configured to travel along guideways in the seat frame 104.

The passenger seat assembly 100 on the left is shown with its backrest extension 112 in the extended position and its monitor 114 rotated relative to the backrest extension 112, considering the reclined and lowered state of the passenger seat assembly 100. The passenger seat assembly 102 on the right is shown with its backrest extension 122 in the retracted condition and its monitor 114 within the backrest extension 112. It can be seen from the figures that the backrest extension 112 is configured to move upward to occupy space above the top of the backrest 110 to maintain privacy between seat rows. At the same time, the vertical position of the monitor 114 is substantially maintained as is the viewing angle of the monitor 114 considering the available rotation of the monitor 114 relative to the backrest extension 112.

Figure 2:
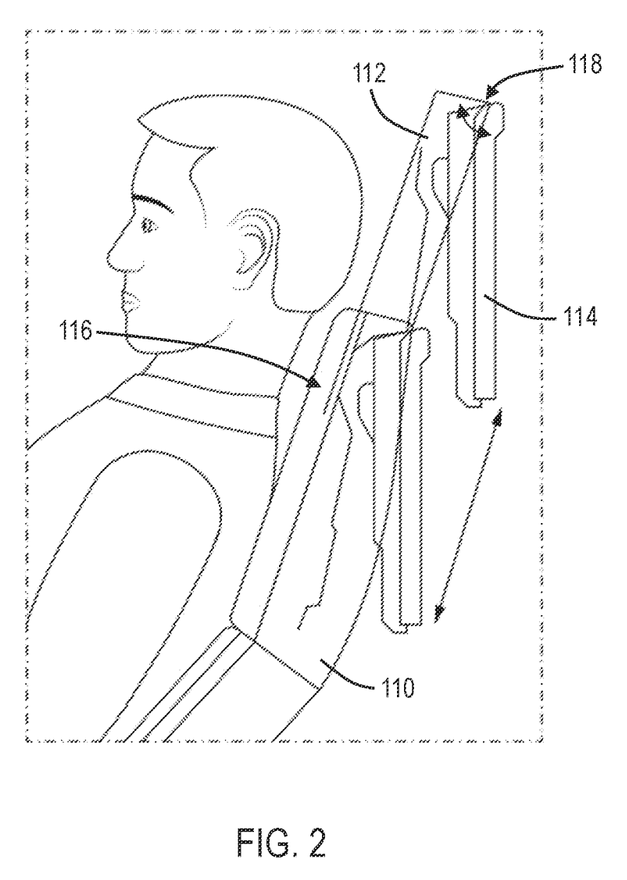
FIG. 2 is a detailed view of the top portion of the backrest showing the backrest extension positions and movement therebetween.

FIG. 2 illustrates the adjustment capabilities of the backrest extension 112 and the monitor 114. The backrest extension 112 is configured to move linearly "up" and "down" relative to the backrest 110 between a retracted position within the backrest 110 and an extended position above the top of the backrest 110. In embodiments, the backrest 110 includes a fixed front portion 116 that forms a headrest portion of the backrest. The fixed front portion 166 may serve to mount an additional headrest assembly that may be adjustable relative to the backrest 110. The monitor 114 is rotatably mounted to the backrest extension 112 such that the monitor 114 travels up and down with the backrest extension 112 while also being capable of rotating relative to the backrest extension 112. As shown, the axis of rotation 118 of the monitor 114 may be located proximal to the top of the monitor 114 such that the bottom of the monitor 114 can be manipulated to change the tilt of the screen.

Figure 3:
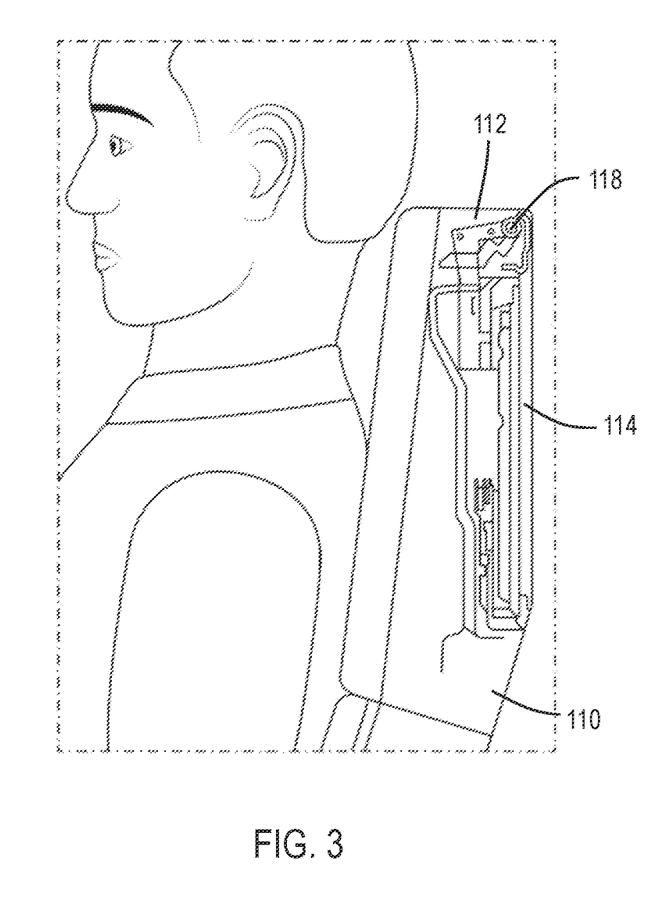
FIG. 3 is another detailed view of the top portion of the backrest showing the backrest extension in the retracted position and the monitor fully within the backrest extension, in accordance with example embodiments of this disclosure.

FIG. 3 illustrates a non-limiting example of a subassembly including the backrest extension 112 and the monitor 114. In embodiments, the axis of rotation 188 is positioned above the monitor 114 such that the bottom free edge of the monitor 114 can be rotated away from the backrest extension 112 to angle the screen upward. In some embodiments, the subassembly may include a brace 120 defining discrete positions configured to interact with the backrest extension 112 and/or structure positioned in the backrest extension 112. Electrical connections may be concealed from view behind the monitor 114, routed down through the backrest extension 112, and routed through the backrest 110.

Figure 4:
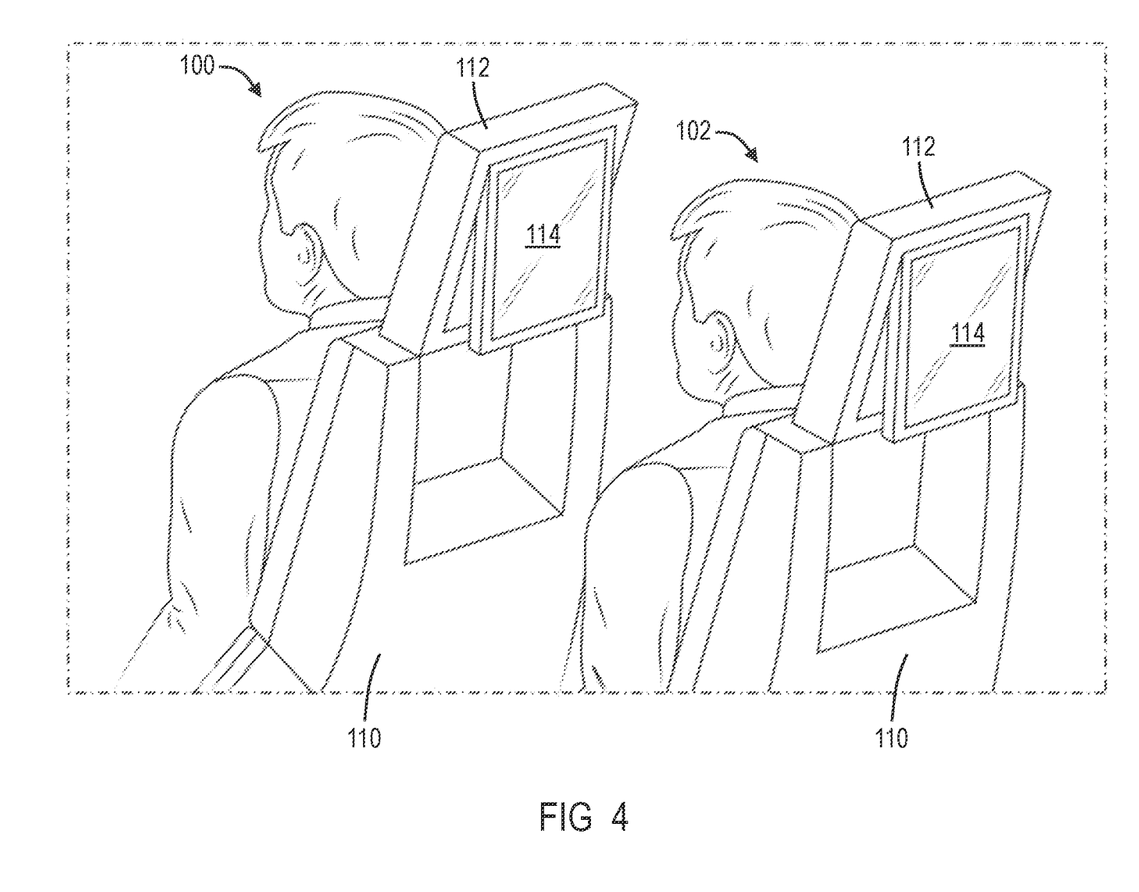
FIG. 4 is a perspective view showing backrest extensions and rotated monitors in use in a passenger cabin, in accordance with example embodiments of this disclosure.

FIG. 4 illustrates passenger seat assemblies 100, 102 shown longitudinally aligned, for instance in a passenger cabin in an airliner. In embodiments, the width of the backrest extension 112 may be about equal to the width of the top of the backrest 110 such that the backrest extension functions as a privacy divider when in the extended position as shown. The size of the monitor 114 may vary depending on the dimensions of the backrest extension 112.

Figure 5:
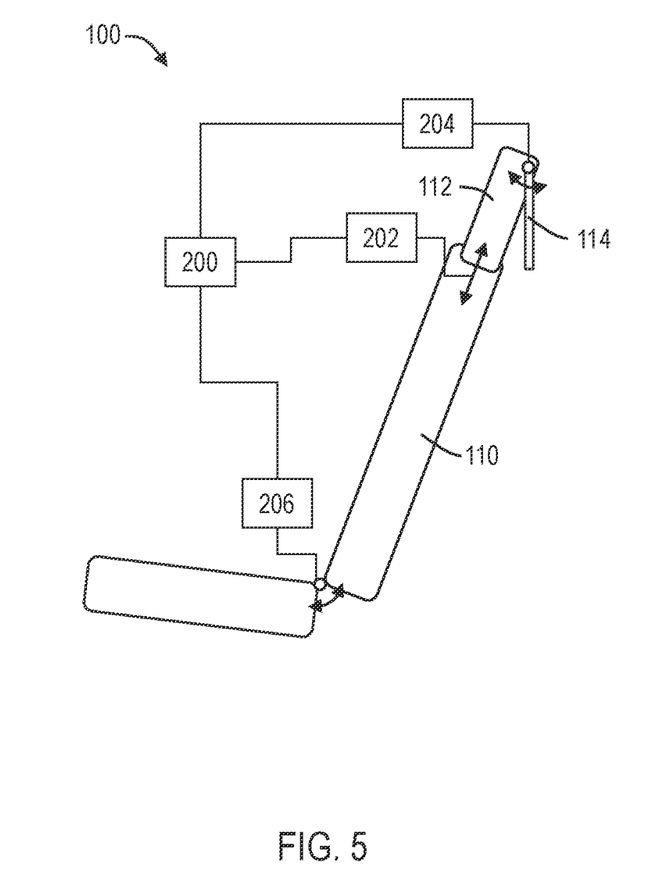
FIG. 5 is a schematic diagram illustrating an actuator control system for the passenger seat assembly, in accordance with example embodiments of this disclosure.

FIG. 5 illustrates an automated version of the passenger seat assembly 100. In embodiments, a controller 200 is operably coupled to a plurality of actuators configured to perform adjustments of the seat components. As shown, a first actuator 202 is coupled between the backrest 110 and the backrest extension 112 and is operable for moving the backrest extension 112 between its extended position and retracted position. For example, the first actuator 202 may be a linear actuator. A second actuator 204 is coupled between the backrest extension 112 and the monitor 114 and is operable for rotating the monitor 114 relative to the backrest extension 112. A third actuator 206 is operable for at least one of backrest recline and backrest lowering, for instance through control of the axis of rotation of the backrest 110.

In embodiments, the controller 200 is configured to coordinate operation of at least some of the actuators. For example, responsive to the third actuator 206 changing the reclined state of the backrest 110, the controller 200 may operate at least one of the first and second actuators 202, 204 to alleviate the passenger in the next row from having to manually adjust the monitor elevation and viewing angle each time a seat recline adjustment is made. In embodiments, the amount of backrest extension translation and/or monitor rotation may be determined by the amount of rotation of the backrest 110, wherein movement of the backrest 110 to a fully reclined state may cause the backrest extension 112 to be moved to the fully extended state and the monitor 114 to be rotated to its fully deployed state. In embodiments, the operation of the first actuator 202 and the operation of the second actuator 204 are mutually inclusive operations, for example, performed to maintain a substantially consistent monitor position. In some embodiments, in preparation for TTOL, the controller 200 may operate to return the backrest 110 to upright, retract the backrest extension 112 into the backrest 110, and rotate the monitor 114 to its stowed position in the backrest extension 112, in no particular order. In embodiments, the controller 200 may be part of a passenger seat controller including a user interface.

The controller 200 may be configured to detect, determine, operate, etc. The controller 200 may include at least one processor, memory, and a communication interface. The processor provides processing functionality for at least the controller 200 and may include any number of processors, micro-controllers, circuitry, field programmable gate array (FPGA) or other processing systems, and resident or external memory for storing data, executable code, and other information accessed or generated by the controller. The processor may execute one or more software programs embodied in a non-transitory computer readable medium (e.g., memory) that implements techniques described herein. The processor is not limited by the materials from which it is formed, or the processing mechanisms employed therein and, as such, can be implemented via semiconductor(s) and/or transistors (e.g., using electronic integrated circuit (IC) components), and so forth.

The memory may be an example of tangible, computer-readable storage medium that provides storage functionality to store various data and/or program code associated with operation of the controller/processor, such as software programs and/or code segments, or other data to instruct the processor, and possibly other components of the controller 200, to perform the functionality described herein. Thus, the memory can store data, such as a program of instructions for operating the controller 200, including its components (e.g., processor, communication interface, etc.), and so forth. It should be noted that while a single memory is described, a wide variety of types and combinations of memory (e.g., tangible, non-transitory memory) may be employed. The memory may be integral with the processor, may comprise stand-alone memory, or may be a combination of both. Some examples of the memory may include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface may be operatively configured to communicate with components of the controller 200. For example, the communication interface may be configured to retrieve data from the processor or other devices, transmit data for storage in the memory, retrieve data from storage in the memory, and so forth. The communication interface may also be communicatively coupled with the processor to facilitate data transfer between components of the controller and the processor. It should be noted that while the communication interface is described as a component of the controller, one or more components of the communication interface may be implemented as external components communicatively coupled to the controller via a wired and/or wireless connection. The controller 200 may also include and/or connect to one or more input/output (I/O) devices (e.g., human machine interface (HMI) devices) via the communication interface. In embodiments, the communication interface may include a transmitter, receiver, transceiver, physical connection interface, or any combination thereof.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A passenger seat assembly, comprising:
   a seat frame;
   a seat pan coupled to the seat frame;
   a backrest coupled to the seat frame;
   a backrest extension movably coupled to the backrest, the backrest extension configured to move between a retracted position within the backrest and an extended position above a top of the backrest;
   a monitor rotatably mounted to the backrest extension and movable with the backrest extension;
   a first actuator coupled to the backrest and to the backrest extension;
   a second actuator coupled to the backrest extension and to the monitor; and
   a controller, including a processor, configured to:
      operate the first actuator to move the backrest extension toward the extended position as the backrest reclines and lowers, wherein the amount of movement of the backrest extension is determined by the amount of backrest recline and lowering; and
      operate the second actuator to rotate the monitor, wherein the amount of rotation of the monitor is determined by the amount of backrest recline and lowering.

2. The passenger seat assembly according to claim 1, wherein the operation of the first actuator and the operation of the second actuator are coordinated.

3. The passenger seat assembly according to claim 1, further comprising a third actuator coupled to the seat frame and to the backrest, wherein the controller is further configured to operate the third actuator to rotate the backrest.

4. The passenger seat assembly according to claim 3, wherein the controller is configured to coordinate operation of the first actuator, the second actuator, and the third actuator.

5. The passenger seat assembly according to claim 1, wherein the seat pan is configured to lower as the backrest reclines and lowers.

6. The passenger seat assembly according to claim 1, wherein the backrest is configured with more than 5 degrees of recline.

7. The passenger seat assembly according to claim 1, wherein the backrest is configured with more than 10 degrees of recline.

8. The passenger seat assembly according to claim 1, wherein the backrest comprises a fixed headrest portion, and the backrest extension is positioned behind the fixed headrest portion.

9. The passenger seat assembly according to claim 1, wherein the backrest extension and the backrest have substantially equal widths.

10. An aircraft passenger seat assembly, comprising:
    a seat frame;
    a seat pan coupled to the seat frame;
    a backrest coupled to the seat frame, the backrest having an axis of rotation configured to lower as the backrest reclines;
    a backrest extension movably coupled to the backrest, the backrest extension configured to move between a retracted position within the backrest and an extended position above a top of the backrest;
    a monitor rotatably mounted to the backrest extension and movable with the backrest extension;
    a first actuator coupled to the backrest and to the backrest extension;
    a second actuator coupled to the backrest extension and to the monitor; and
    a controller, including a processor, configured to:
       operate the first actuator to move the backrest extension toward the extended position as the backrest reclines, wherein the amount of movement of the backrest extension is determined by the amount of backrest recline; and operate the second actuator to rotate the monitor, wherein the amount of rotation of the monitor is determined by the amount of backrest recline;

wherein the operations of the first and second actuators are coordinated.

11. The aircraft passenger seat assembly according to claim 10, further comprising a third actuator coupled to the seat frame and to the backrest, wherein the controller is further configured to operate the third actuator to rotate the backrest.

12. The aircraft passenger seat assembly according to claim 11, wherein the controller is configured to coordinate operation of the first actuator, the second actuator, and the third actuator.

13. The aircraft passenger seat assembly according to claim 10, wherein the backrest is rotatably coupled the seat pan about the axis of rotation of the backrest, and wherein the seat pan is configured to lower as the backrest reclines.

14. The aircraft passenger seat assembly according to claim 10, wherein the backrest is configured with more than 5 degrees of recline.

15. The aircraft passenger seat assembly according to claim 10, wherein the backrest is configured with more than 10 degrees of recline.

16. The aircraft passenger seat assembly according to claim 10, wherein the backrest comprises a fixed upper portion, and the backrest extension is positioned behind the fixed upper portion.

17. The aircraft passenger seat assembly according to claim 1, wherein the backrest extension and the backrest have substantially equal widths.

\* \* \* \* \*